Nov. 2, 1948.    J. N. WOLFRAM    2,452,890
COUPLING FOR TUBES
Filed Jan. 24, 1945

INVENTOR.
John N. Wolfram.
BY
Mason, Porter & Diller
Attys.

Patented Nov. 2, 1948

2,452,890

UNITED STATES PATENT OFFICE 2,452,890

COUPLING FOR TUBES

John N. Wolfram, Cleveland, Ohio, assignor to The Parker Appliance Company, Cleveland, Ohio, a corporation of Ohio Application January 24, 1945, Serial No. 574,266

1 Claim. (Cl. 285—123)

The invention relates to new and useful improvements in a coupling for tubes and more particularly a coupling for a tube of substantially uniform diameter throughout.

An object of the invention is to provide a coupling for a sleeve forced into gripping contact with the tube for holding the same in the coupling with means for preventing the sleeve from turning with the nut when the coupling is closed.

A further object of the invention is to provide a coupling of the above type wherein the holding sleeve is provided with gripping fingers at the outer portion thereof contacted with by the nut for contracting the fingers into gripping engagement with the tube, and therein the sleeve is contacted with by the body member at the inner portion thereof for holding the same from turning with the nut when the coupling is closed.

A still further object of the invention is to provide a coupling of the above type wherein a ring sealing gasket is disposed between the gripping sleeve and the inner end of the tube.

These and other objects will in part be obvious and will in part be hereinafter more fully described.

In the drawings, which show by way of illustration one embodiment of the invention—

Figure 1:
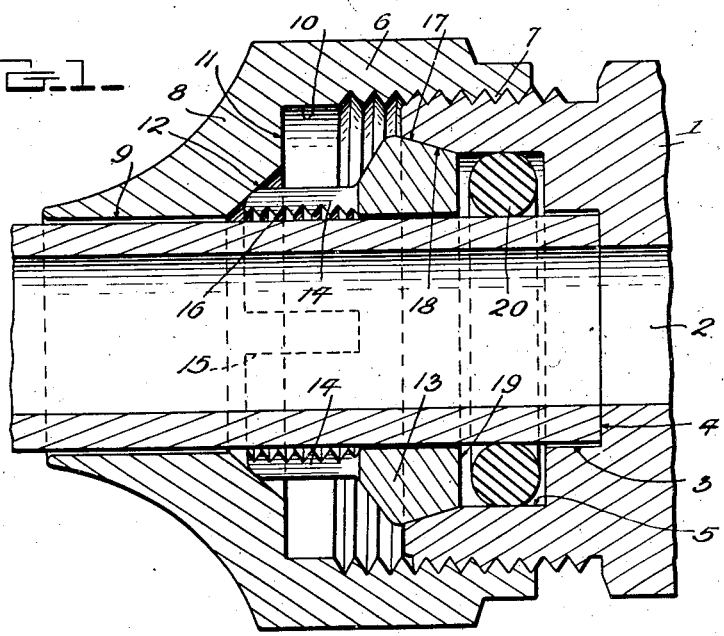
Figure 1 is a longitudinal sectional view through the coupling with the nut in finger-tight engagement with the body member.

The invention, as shown in the illustrated embodiment thereof, includes a body member 1 having a bore 2 therethrough of substantially the same diameter as the bore of the tube. Said body member has a counterbore 3 adapted to receive the end of the tube which seats against a shoulder 4 on the body member. The body member is provided with a second counterbore 5 which forms an annular recess about the tube engaging the seat 4 for a sealing gasket.

A nut 6 has a threaded engagement 7 with the body member. Said nut has an inwardly extending flange 8 provided with an opening 9 through which the tube is inserted in the coupling. This flange 8 is extended outwardly along the tube as shown in Figure 1. The nut has a cylindrical recess 10. The wall 11 at the inner side of the recess terminates adjacent the tube in an inclined cam face 12.

Located within the nut and the counterbore 5 of the body member is a sleeve 13. The sleeve is formed with a solid head from which extent gripping fingers 14. These gripping fingers are formed by cutting away portions of the sleeve longitudinally of the sleeve from the outer end thereof to the solid head 13, as indicated by the broken lines 15 in Figure 1. These gripping fingers are provided with V-shaped sharp teeth 16 on their inner faces. This portion of the sleeve is of smaller diameter than the solid head 13.

The wall of the counterbore 5 of the body member is inclined outwardly as indicated at 17. The outer face 18 of the solid head 13 is inclined so as to conform substantially to the inclination of the surface 17 of the body member. The sleeve fits the outer surface of the tube with a slight tolerance so that the sleeve can be readily slipped onto the tube. The same is true of the opening 9 in the flange 8 of the nut.

When the coupling parts are positioned as shown in Figure 1, the sleeve is forced into contact with the inclined camming face of the body member. The sleeve forms the outer radial wall of the recess formed by the counterbore 5 as indicated at 19. Located in this recess, bounded on two sides by the body member and on the third side by the sleeve and on the inner side by the tube, is a deformable ring gasket 20, preferably of rubber. This ring gasket is so dimensioned that the inner diameter thereof is slightly less than the outer diameter of the tube so that when the ring is slipped onto the tube it will be deformed sufficiently to make a tight gripping contact with the tube. This ring is also of slightly greater diameter than the counterbore 5, so that when the ring is forced into this counterbore and confined in the recess thereof said ring will be deformed so as to make a very tight sealing engagement with the wall of the bore 5.

Figure 2:
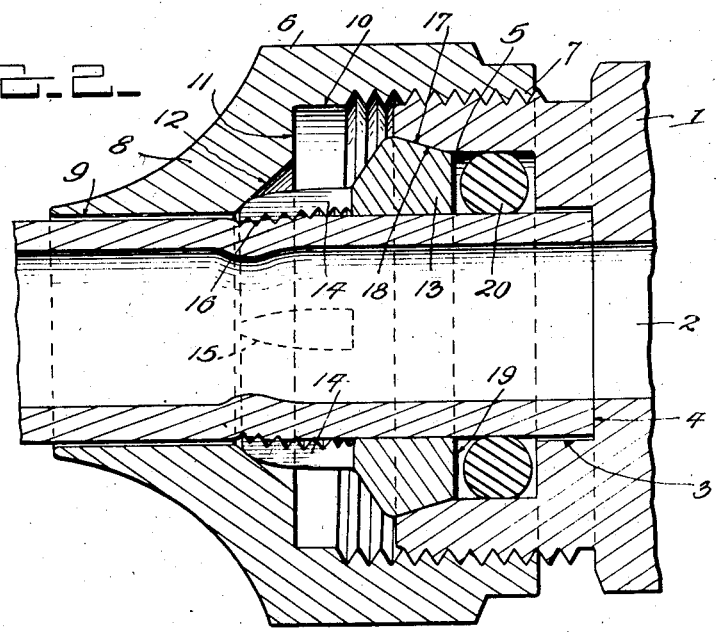
Figure 2 is a view similar to Figure 1 showing the coupling completely closed and the tube gripped by the holding sleeve.

The nut, sleeve, and gasket are preferably placed on the tube and then the nut is threaded onto the body member. When the parts are brought to a finger-tight position of the nut, the sleeve will contact with the inclined face on the body member at its inner end and will contact with the inclined cam face 12 on the nut at its outer end. When the nut is turned further onto the body member for closing the coupling, the cam face 12 on the nut, contacting with the outer ends of the gripping fingers, will contract the same into engagement with the tube and will cause the teeth on the gripping fingers to bite into the tube, as shown in Figure 2. This provides a very tight grip between the tube and the sleeve which will firmly hold the tube in the coupling. The tube is preferably placed against the seat 4 which positions the tube in the coupling but this seat is not essential to the contracting of the sleeve for the gripping of the tube.

When the nut is turned onto the body member for contracting the fingers, it forces the sleeve against the inclined face and the inclined face will act as a cam for contracting the inner end of the sleeve into tight engagement with the tube. This contact of the sleeve with the body member also serves as a means for preventing the sleeve from rotating with the nut so that the nut, as it is turned, will rotate relative to the sleeve and thus the teeth on the gripping fingers will be forced radially inwardly without turning on the tube until a very firm grip of the fingers on the tube is obtained.

The gasket, being deformed by contact with the tube and also being deformed by contact with the body member, will effect a fluid tight seal for the coupling. If there is excessive pressure on the fluid on the line it will cause the gasket to move into contact with the end of the sleeve and further deform the gasket so as to increase the tightness of the seal between the gasket and the tube on the one hand and the body member on the other. Inasmuch as the sleeve is in tight contact with the body member and is contracted into tight contact with the tube by the closing of the coupling, there is no chance of the gasket being extruded between the tube and the sleeve or between the sleeve and the body member. In other words, the tolerance initially provided between the sleeve and the tube to facilitate assembling of the parts has been closed up through the camming action of the inclined face 17 on the sleeve.

It is obvious that many changes may be made in the details of construction and the shaping of the parts without departing from the spirit of the invention as set forth in the appended claims. It is essential, however, that the sleeve shall be forced into gripping engagement with the tube by contact of the nut with the outer end of the sleeve which is to be contracted. It is also essential that the sleeve shall have a wedging connection with the body member so that when the coupling is closed the sleeve will be held from turning by the body member and will not rotate with the nut.

I claim:

A coupling for tubes comprising a body member, a nut having a threaded engagement therewith, said nut having an inwardly extending flange provided with an inclined camming face at the inner side thereof, said body member having a counterbore providing an annular recess surrounding the tube, said counterbore terminating in an inclined face at the outer end thereof, a sleeve disposed within said nut and body member, said sleeve having spaced gripping fingers at the outer end portion thereof adapted to be engaged by the inclined camming face of the nut for contracting the same into gripping engagement with the tube when the nut is turned on to the body member, said gripping fingers having teeth biting into said tube, said sleeve at the inner end thereof having a solid head provided with an inclined face adapted to wedgingly engage the inclined face of the body member whereby the inner end portion of the sleeve is contracted into tight engagement with the tube and said sleeve is held from rotation during the turning of the nut, said sleeve head closing the counterbore in the body member and forming a closed chamber for a sealing gasket and a deformable ring sealing gasket disposed in said chamber, said gasket being dimensioned so as to make sealing contact with the tube and the outer wall of the bore of the body member, said gasket being free to move longitudinally in said chamber whereby fluid pressure on the line will force the gasket against the solid head of the sleeve and cause the gasket to be expanded into tighter sealing contact with the tube and the body member.

JOHN N. WOLFRAM.

REFERENCES CITED

The following references are of record in the file of this patent:

UNITED STATES PATENTS

| Number | Name | Date |
|---|---|---|
| 1,712,273 | Kennedy | May 7, 1929 |
| 1,743,922 | Kirlin | Jan. 14, 1930 |
| 2,351,363 | Parker | June 13, 1944 |
| 2,383,692 | Smith | Aug. 28, 1945 |